Patented June 26, 1923.

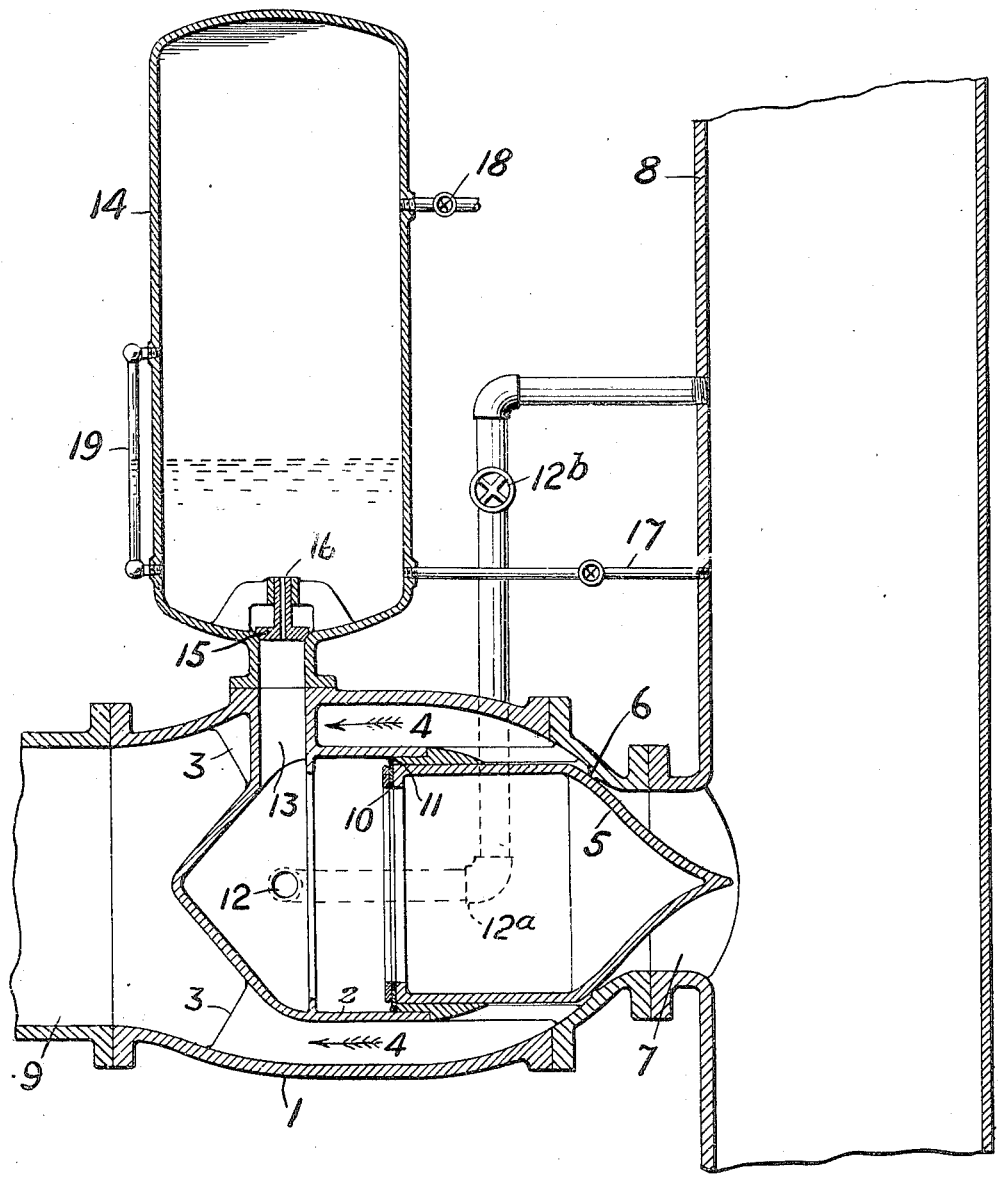

1,459,775

UNITED STATES PATENT OFFICE.

CHESTER W. LARNER, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

PRESSURE-RELIEF VALVE.

Application filed December 7, 1920. Serial No. 428,882.

*To all whom it may concern:*

Be it known that I, CHESTER W. LARNER, a citizen of the United States, residing at Philadelphia, in the county of Philadelphia and State of Pennsylvania, have invented certain new and useful Improvements in Pressure-Relief Valves, of which the following is a specification.

The invention in this case consists of a valve for connection to a conduit or pipe line under pressure such as a penstock leading to a turbine in a water power plant or the discharge line from a pump in a pumping station in which the pressure is subject to considerable fluctuation above normal as a result of stopping or slowing down the velocity in the conduit or pipe line. It is well known, of course, that in pipe lines of considerable length the velocity of flow cannot be quickly decelerated without a corresponding rise of pressure and, of course, if the pressure increase is sufficiently great it may endanger the pipe or machinery connected to it.

The valve of this invention opens automatically under such conditions, discharging water from the conduit to the atmosphere or some region of lower pressure and thus avoiding the sudden deceleration of velocity in the conduit, which if not relieved would cause excessive pressure rise or so-called water hammer. The valve of this invention is a device which has wide application in the arts, the specific cases mentioned being merely for the purpose of illustration.

The drawings illustrate principally in central section, a pressure relief valve embodying one form of the invention.

The valve consists of a cylindrical body 1 containing an internal cylinder 2 closed at one end and connected to the body by radial ribs 3, thus forming an annular waterway 4 between the body 1 and cylinder 2. Cylinder 2 contains a plunger 5 seating at 6 in the neck of the valve body 1.

The valve body 1 is connected to an outlet 7 on the conduit 8 and thus a portion of the nose of plunger 5 lying within the circumference of the seat 6 is subjected to the pressure of the conduit when the valve is closed, whereas the balance of the exterior surface of the plunger nose is subjected to atmospheric pressure because the outlet 9 discharges to the atmosphere.

The end of plunger 5 is provided with a flexible leather or like packing ring 10 which seats against a shoulder 11 in cylinder 2 when the plunger is closed. This packing prevents the escape of pressure from inside of cylinder 2 to the waterway 4.

Cylinder 2 has a port 12 leading through body 1 and connected by a pipe $12^a$ provided with a stop valve $12^b$, to conduit 8 at a point considerably removed from outlet 7, the purpose of this connection being to supply practically full conduit pressure inside of cylinder 2 to close plunger 5 after it has opened for the relief of excess pressure. Connection 12 is normally closed and is opened only for the purpose of closing or resetting the relief valve.

Cylinder 2 also has a port 13 leading through body 1 and connected to tank 14, a check valve 15 being provided with a hole 16 through it, the purpose of the check valve being to permit free flow from cylinder 2 to tank 14 but to restrict the flow from tank 14 to cylinder 2.

Tank 14 is connected to conduit 8 by a small pipe 17 which admits conduit pressure to the tank. Another connection 18 is also provided which is utilized to pump air in or let air out of tank 14, for example, in order to properly adjust the water level in the tank, a sight gauge 19 being attached to make the water level visible.

It is obvious that with pipe 17 open conduit pressure will be communicated to tank 14 and also to cylinder 2 and when pressure has been thus established no flow will occur in pipe 17 except what may be necessary to make up leakage around the plunger from cylinder 2, to waterway 4. The air contained above the water level in tank 14 will be under the same pressure as the water.

The force holding plunger 5 to its seat will be greater than the force tending to unseat plunger 5 because the unit pressures on both sides of the plunger nose are equal, but in the former case the pressure is exerted over the full cross sectional area of plunger 5, whereas in the latter case the pressure is exerted only over the area bounded by the seat 6. It is thus clear that plunger 5 will not open until the pressure in conduit 8 has increased sufficiently to overcome this discrepancy. The pressure increase necessary to open the valve depends upon the ratio of the full cross sectional area of plunger 5 to the area bounded by the seat 6. If, for example, the plunger is 25% greater in area than the seat the pressure in conduit 8 will have to increase a little more than 25% in order to open plunger 5, but when this increase has occurred plunger 5 will open instantly because it is held closed by an elastic body of air or like medium in tank 14 which only needs to be compressed sufficiently to permit the water displaced from cylinder 2 to enter tank 14 through port 13. Port 13 is made of liberal area in order that the velocity of the displaced water passing into the tank will be relatively low and thus the inertia of the water will not be sufficient to check appreciably the opening of plunger 5.

Pipe 17 may be called a choke pipe and it is made relatively small in order to prevent a sudden increase of pressure in conduit 8 from being communicated to tank 14 and cylinder 2. Gradual increases of pressure in conduit 8 will be so communicated and thus plunger 5 will not open except in cases of sudden pressure increase or water hammer.

The purpose of check valve 15 is to prevent plunger 5 from closing automatically after it has opened for the relief of pressure or to permit the plunger to close automatically but at a restricted rate of travel. Either arrangement may be utilized, the difference between the two being merely in size of port 16. Ordinarily it is best to have port 16 so small that although it will supply leakage out of cylinder 2, when the plunger is closed and packing 10 is seated, it will not supply the leakage when plunger 5 is open and the packing ineffective. In this case the plunger after opening stays open until it is closed under manual control by admitting water from the conduit through port 12. On the other hand, if port 16 is made enough larger it will not only supply the leakage out of cylinder 2 when the plunger is open but will supply enough additional water under conduit pressure to close the plunger at a restricted rate of travel as soon as the sudden pressure rise or water hammer in the conduit has subsided. It is only necessary then to establish conduit pressure in cylinder 2 to close plunger 5.

One advantage of this form of relief valve lies in the fact that the moving element is held closed by a perfectly elastic medium, that the inertia of the moving element and the displaced water are negligible and that the moving element itself is directly acted upon by the pressure which it is intended to relieve. In this respect it is much superior to other types of relief valves wherein the pressure of the conduit acts upon pilot valves or other secondary mechanism which in turn actuate the main element of the valve which opens and relieves the pressure. The time element which is introduced by such devices is fatal because dangerous pressure rise or water hammer is practically instantaneous and unless the relief valve opens instantaneously it might just as well not open at all.

If desired, connection 17 may be omitted and proper air pressure maintained as by way of 18, in tank 14 and cylinder 2 to hold plunger 5 closed. This arrangement is theoretically better than the other already described in that the volume of air is increased and there is no water to displace from cylinder 2, but it offers practical difficulties in that it is difficult to hold air pressure with packing 10. It is, in most cases and as a practical matter, better to have packing 10 water sealed and it is a simple matter to maintain air pressure by connection 17 to the conduit. With this arrangement the only additional air which it is ever necessary to supply is that which may be lost by leakage or absorbed by the water and this is so little that it may easily be supplied by a hand pump.

The percentage of pressure rise above normal which is to actuate the relief valve must be known beforehand in order that the necessary ratio of plunger area to seat area may be properly provided. This percentage of actuating pressure above normal pressure will, however, be maintained constant regardless of changes of pressure in the conduit provided these changes occur slowly. This characteristic is due to the restricted flow through pipe 17.

It will be obvious to those skilled in the art to which the invention relates that modifications may be made in details of construction and arrangement without departing from the spirit of the invention which is not limited as to such matters or otherwise than as the prior art and the appended claims may require.

I claim:

1. A relief valve comprising the combination of a body containing an internal cylinder closed at one end and having between it and the body an annular water way through which pressure is relieved, an air tank communicating with the cylinder, and a piston arranged in the cylinder and co-operating with the body as a valve seat and having differential areas of which one is exposed to the pressure to be relieved and of which the other is exposed to the pressure in the tank to normally hold the valve closed.

2. A relief valve comprising, in combination, a body containing an internal cylinder closed at one end and having between it and the body an annular water way through which pressure is relieved, an air tank communicating with the cylinder, means for equalizing the pressure to be relieved and the pressure in the tank for slow but not for sudden pressure changes, and a piston arranged in the cylinder and co-operating with the body as a valve seat and having differential areas of which one is exposed to the pressure to be relieved and of which the other is exposed to the pressure in the tank to normally hold the valve closed.

3. A relief valve having a movable valve element which opens to relieve a sudden increase in pressure and upon which the pressure to be relieved directly acts, and provisions including a fluid medium which act to normally hold the movable element in closed position, and means to transmit a relatively slow increase in pressure to said fluid medium to hold said valve closed against said slow increase in pressure.

4. A relief valve having a movable valve element directly exposed to and opened by the pressure to be relieved, provisions including a gaseous medium which acts to normally hold the movable element in closed position, and means for normally balancing the pressure of the gaseous medium and the pressure to be relieved and for excluding sudden rises in pressure from the gaseous medium so that the valve will open only under such sudden rises in pressure, substantially as described.

5. A relief valve having, in combination, a movable valve element of differential areas of which one is exposed directly to the pressure to be relieved, a tank containing a gaseous medium under pressure acting upon the other area to normally hold the valve closed and adapted to permit it to open upon sudden increase in the pressure to be regulated.

6. A relief valve having, in combination, a movable valve element of differential areas of which one is exposed directly to the pressure to be relieved, a tank containing a gaseous medium under pressure acting upon the other area to normally hold the valve closed and adapted to permit it to open upon sudden increase in the pressure to be regulated, and means for automatically equalizing the pressure to be regulated and the pressure in the tank for slow but not for sudden changes in the pressure to be regulated, substantially as described.

7. In combination a fluid conduit in which pressure is to be relieved, a valve having a movable valve element of differential areas of which one is exposed to the pressure in the conduit, an air tank communicating with the other area of the valve, and an adjustable connection between the conduit and the tank communicating slow rises in pressure to said air tank to hold said valve closed, substantially as described.

8. In combination a fluid conduit in which pressure is to be relieved, a valve having a movable valve element of differential areas of which one is exposed to the pressure in the conduit, an air tank communicating with the other area of the valve, a choke connection between the conduit and the tank, and a check valve between the tank and the valve area upon which it operates.

9. In combination a water conduit in which the sudden rise in pressure is to be relieved, a body containing an internal cylinder closed at one end and having between it and the body an annular water way communicating with the conduit and with the atmosphere, an air tank communicating with the cylinder, a choke fluid connection between the conduit and tank for equalizing gradual changes of pressure, a piston arranged in the cylinder and co-operating with the body as a valve seat and having differential areas of which one is exposed directly to the pressure in the conduit and the other is exposed to the pressure in the tank, substantially as described.

10. In combination a water conduit in which the sudden rise in pressure is to be relieved, a body containing an internal cylinder closed at one end and having between it and the body an annular water way communicating with the conduit and with the atmosphere, an air tank communicating with the cylinder, a choke fluid connection between the conduit and tank for equalizing gradual changes of pressure, a piston arranged in the cylinder co-operating as a valve with the body to control the conduit and with the cylinder to retain tank pressure and having differential areas of which the smaller one is exposed to conduit pressure and the larger one to tank pressure, and a check valve interposed between the cylinder and tank and having an open passage or by-pass, substantially as described.

11. In combination a water conduit in which the sudden rise in pressure is to be relieved, a body containing an internal cylinder closed at one end and having between it and the body an annular water way communicating with the conduit and with the atmosphere, an air tank communicating with the cylinder, a choke fluid connection between the conduit and tank for equalizing gradual changes of pressure, a piston arranged in the cylinder co-operating as a valve with the body to control the conduit and with the cylinder to retain tank pressure and having differential areas of which the smaller one is exposed to conduit pressure and the larger one to tank pressure, a check valve interposed between the cylinder and tank and having an open passage or by-pass, and another valved pressure connection to the cylinder for closing the valve, substantially as described.

12. In combination a fluid conduit in which sudden pressure is to be relieved, a plunger valve having the nose of its plunger exposed to the pressure in the conduit and directly acted on thereby, and means including a tank containing air acting on the plunger and controlled by fluid conduit pressure for normally holding said plunger in closed position during slow variations in conduit pressure and for permitting it to open upon sudden increase of fluid pressure on the nose of the plunger, substantially as described.

CHESTER W. LARNER.